US012562677B2

(12) United States Patent
Chen et al.

(10) Patent No.: US 12,562,677 B2
(45) Date of Patent: Feb. 24, 2026

(54) PHOTOVOLTAIC ASSEMBLY CONVENIENT FOR ANGLE ADJUSTMENT

(71) Applicants: HUANENG SHANXI COMPREHENSIVE ENERGY CO., LTD., Taiyuan (CN); HUANENG YUSHE POVERTY ALLEVIATION ENERGY CO., LTD., Jinzhong (CN); HUANENG SHANXI COMPREHENSIVE ENERGY CO., LTD. YUSHE PHOTOVOLTAIC POWER STATION, Jinzhong (CN); LICHENG YINGHENG CLEAN ENERGY CO., LTD., Changzhi (CN); HUANENG RUICHENG COMPREHENSIVE ENERGY CO., LTD., Yuncheng (CN); HUANENG ZUOQUAN YANGJIAO WIND POWER CO., LTD., Jinzhong (CN); RUICHENG NINGSHENG NEW ENERGY CO., LTD., Yuncheng (CN); WUZHAI TAIZHONG NEW ENERGY WIND POWER GENERATION CO., LTD., Xinzhou (CN); SHUOZHOU TAIZHONG WIND POWER GENERATION CO., LTD., Shuozhou (CN)

(72) Inventors: Yong Chen, Taiyuan (CN); Yamin Chang, Taiyuan (CN); Zhuanghua Zhu, Taiyuan (CN); Xuefeng Shi, Taiyuan (CN); Zhihong Liu, Taiyuan (CN); Zhizhong Peng, Taiyuan (CN); Jianhua Liu, Taiyuan (CN); Yanjun Chen, Taiyuan (CN)

(73) Assignees: HUANENG SHANXI COMPREHENSIVE ENERGY CO., LTD., Taiyuan (CN); HUANENG YUSHE POVERTY ALLEVIATION ENERGY CO., LTD., Jinzhong (CN); HUANENG SHANXI COMPREHENSIVE ENERGY CO., LTD. YUSHE PHOTOVOLTAIC POWER STATION, Jinzhong (CN); LICHENG YINGHENG CLEAN ENERGY CO., LTD., Changzhi (CN); HUANENG RUICHENG COMPREHENSIVE ENERGY CO., LTD., Yuncheng (CN); HUANENG ZUOQUEN YANGJIAO WIND POWER CO., LTD., Jinzhong (CN); RUICHENG NINSHENG NEW ENERGY CO., LTD., Yuncheng (CN); WUZHAI TAIZHONG NEW ENERGY WIND POWER GENERATION CO., LTD., Xinzhou (CN); SHUOZHOU TAIZHONG WIND POWER GENERATION CO., LTD., Shuozhou (CN)

( * ) Notice: Subject to any disclaimer, the term of this patent is extended or adjusted under 35 U.S.C. 154(b) by 0 days.

(21) Appl. No.: 19/180,073

(22) Filed: Apr. 15, 2025

(65) Prior Publication Data

US 2025/0337351 A1 Oct. 30, 2025

Related U.S. Application Data

(63) Continuation of application No. PCT/CN2024/081689, filed on Mar. 14, 2024.

(30) Foreign Application Priority Data

Sep. 20, 2023 (CN) .......................... 202311213114.X

(51) Int. Cl.
*H02S 20/30* (2014.01)
(52) U.S. Cl.
CPC ..................................... *H02S 20/30* (2014.12)
(58) Field of Classification Search
CPC ........... H02S 20/30; H02S 20/32; H02S 30/10
See application file for complete search history.

(56) References Cited

U.S. PATENT DOCUMENTS

2024/0421755 A1* 12/2024 Gacka .................... H02S 20/30

FOREIGN PATENT DOCUMENTS

| CN | 111525879 A | 8/2020 |
|----|-------------|--------|
| CN | 112564605 A | 3/2021 |

(Continued)

*Primary Examiner* — Daniel P Malley, Jr.

(57) ABSTRACT

The disclosure relates to the technical field of photovoltaic power generation, in particular to a photovoltaic assembly convenient for angle adjustment, which includes a photovoltaic mounting base and a photovoltaic mounting frame. The photovoltaic mounting base is fixed on a fixture and is used for providing an installation station. The photovoltaic mounting frame is detachably mounted on the photovoltaic mounting base and can adjust angle, and a mounting end of the photovoltaic mounting frame can adjust mounting size and is used for mounting photovoltaic panels. The inclination angle of the photovoltaic panel can be detected in real time, and the angle of the photovoltaic panel can be adjusted according to environmental factors such as illumination, so as to adapt to the actual situation, ensure the smooth power generation and ensure the power generation.

4 Claims, 7 Drawing Sheets

(56) References Cited

FOREIGN PATENT DOCUMENTS

| CN | 215581022 U | 1/2022 |
|----|-------------|--------|
| CN | 114978014 A | 8/2022 |
| CN | 115347858 A | 11/2022 |
| CN | 219592322 U | 8/2023 |
| CN | 219659637 U | 9/2023 |
| JP | 2016127716 A | 7/2016 |

* cited by examiner

PHOTOVOLTAIC ASSEMBLY CONVENIENT FOR ANGLE ADJUSTMENT

CROSS-REFERENCE TO RELATED APPLICATIONS

This application is a continuation of PCT/CN2024/081689, filed on Mar. 14, 2024 and claims priority of Chinese Patent Application No. 202311213114.X, filed on Sep. 20, 2023, the entire contents of which are incorporated herein by reference.

TECHNICAL FIELD

The disclosure relates to the technical field of photovoltaic power generation, in particular to a photovoltaic assembly convenient for angle adjustment.

BACKGROUND

Solar cell assembly (also called solar cell panel) is the core and the most important part of solar power generation system. Its function is to convert solar energy into electric energy, or send it to a storage battery for storage, or push the load to work.

For photovoltaic power plants, the amount of solar radiation is very important, which determines the power generation of the power plant, and the amount of solar radiation is directly related to the installation direction and angle of solar panels. Therefore, when installing solar panels, we need to pay attention to the selection of the best orientation and the best inclination angle. However, the traditional mounting frame of photovoltaic panels is generally fixed in angle, so it is impossible to adjust the angle to achieve the best inclination angle, which will affect the total power generation.

SUMMARY

The disclosure aims at solving one of the technical problems in the related art at least to some extent.

To this end, an embodiment of the disclosure provides a photovoltaic assembly convenient for angle adjustment, including:

a photovoltaic mounting base, where the photovoltaic mounting base is fixed on a fixture and is used for providing an installation station;

the photovoltaic mounting frame, where the photovoltaic mounting frame is detachably mounted on the photovoltaic mounting base and is capable of adjusting angle, and a mounting end of the photovoltaic mounting frame is capable of adjusting mounting size and is used for mounting photovoltaic panels.

In the preferred scheme of the photovoltaic assembly convenient for angle adjustment, the photovoltaic mounting base includes:

two first slideway parts, two first slideway parts are arranged in parallel; each of the first slideway parts has a U-shaped structure, a top of each of the first slideway parts is open, and inner walls of opposite side walls of each of the first slideway parts are provided with a plurality of limiting grooves arranged in parallel, and the limiting grooves are matched with detachable first limiting parts; a plurality of limiting areas are formed by the first limiting parts;

at least two first connecting mechanisms, where the first connecting mechanisms are arranged in corresponding limiting areas of the two first slideway parts; side walls of the first connecting mechanisms are detachably connected with each of the first slideway parts through second connecting mechanisms;

a connecting beam, where two ends of the connecting beam are respectively connected to a top of corresponding one of the first connecting mechanisms, the connecting beam is perpendicular to the first slideway parts; a photovoltaic mounting frame is installed on the connecting beam.

In the preferred scheme of the photovoltaic assembly convenient for angle adjustment, each of the first connecting mechanisms includes:

a connecting base, where a top of the connecting base is provided with a first sliding groove, an annular second sliding groove is arranged outside the first sliding groove, and an inner wall of the second sliding groove is provided with a limiting protrusion;

a sliding frame, where the sliding frame has a cylindrical structure and a middle of the sliding frame is provided with an extension rod; the extension rod extends along the first sliding groove, a middle of an out wall of the extension rod is connected with an extrusion plate, and the extrusion plate is provided with a through hole; a top of the sliding frame is detachably connected with the connecting beam, the outer wall is slidably connected with the limiting protrusion, and a bottom of the outer wall is provided with a limiting baffle, the limiting baffle is connected with a bottom of the second sliding groove through a spring part; flexible buffer pads are arranged between an inner wall of the sliding frame and the extension rod;

a top of the first sliding groove is provided with an expansion area, where an accommodating chamber is embedded in the expansion area and sleeved outside the extension rod to form a sliding sealing structure with the outer wall of the extension rod; the accommodating chamber is filled with a buffer medium, and the extrusion plate is located in the accommodating chamber, and the extrusion plate is capable of reciprocating in the buffer medium;

a rack part vertically connected to a bottom of the extension rod;

a connecting rotating shaft, where the connecting rotating shaft is rotatably connected to opposite side walls of the first sliding groove and is opposite to the rack part;

a gear part, where the gear part is fixed at a middle of the connecting rotating shaft and is is meshed with the rack part;

two spring coiling mechanisms, where the two spring coiling mechanisms are respectively sleeved at positions close to two ends of the connecting rotating shaft, and outer walls are fixed with an inner wall of the first sliding groove; when the gear part and the rack part are displaced relative to each other, the spring coiling mechanisms are stressed and provide a reset reaction force.

In the preferred scheme of the photovoltaic assembly convenient for angle adjustment, a plurality of two second connecting mechanism are provided and are respectively arranged on both sides of each of the first connecting mechanisms; each of the second connecting mechanisms includes:

a fixed shaft vertically fixed on a side wall of the connecting base of each of the first connecting mechanisms;

two rotating plates, where and ends of the two rotating plates are rotatably connected with the fixed shaft respectively; other ends of the two rotating plates are hinged with a first U-shaped frame; the side walls of the first U-shaped frame and the first slideway parts are both provided with suitable connecting holes; an open end of the first U-shaped frame extends along the side wall of each of the first slideway parts, and the first U-shaped frame and each of the first slideway parts are detachably connected through bolts and the connecting holes.

In the preferred scheme of the photovoltaic assembly convenient for angle adjustment, each of the spring coiling mechanisms includes a fixed inner cylinder, a fixed outer cylinder, a spring coiling part, elastic pulling plates and an elastic filler; where, the fixed inner cylinder is sleeved and fixed on an outer wall of the connecting rotating shaft, the fixed outer cylinder is sleeved outside the fixed inner cylinder to form an inner cavity inside, and an outer wall of the fixed outer cylinder is fixed with the inner wall of the first sliding groove, the fixed inner cylinder is capable of rotating relatively with the fixed outer cylinder, an inner end of the spring coiling part is connected with the fixed outer cylinder, and an outer end is connected with the fixed outer cylinder, and a plurality of the elastic pulling plates are arranged inside the spring coiling part and are connected with a corresponding inner wall of the spring coiling part; the elastic filler is filled in the inner cavity.

In the preferred scheme of the photovoltaic assembly convenient for angle adjustment, the top of the sliding frame is connected with the connecting beam through a third connecting mechanism, and the third connecting mechanism includes:

two flange parts, where butting ends of the flange parts are connected by bolts; a connecting end of one of the flange parts is fixed at the top of the sliding frame;

a mounting seat, where the mounting seat has a U-shaped structure and one side is sealed; the mounting seat is fixed at a top connecting end of another one of the flange parts, and a side wall of the mounting seat and ends of the connecting beam are both provided with connecting through holes, the connecting through holes are capable of being connected by bolts after being embedded.

In the preferred scheme of the photovoltaic assembly convenient for angle adjustment, the photovoltaic mounting frame includes:

a frame connector detachably connected to the connecting beam;

an adjustable connecting rod vertically connected to a top of the frame connector;

an adjusting base plate connected with a top of a telescopic rod of the adjustable connecting rod;

an adjusting assembly connected to a top of the adjusting base plate;

a photovoltaic panel fixing frame fixed at an action end of the adjusting assembly.

In the preferred scheme of the photovoltaic assembly convenient for angle adjustment, the frame connector includes a first connector and a second connector; opposite ends of the first connector and the second connector are both provided with clamping grooves adapted to the connecting beam, and edges of the clamping grooves extend outwards to form flange plates, and butting surfaces of the first connector and the second connector are provided with a magnet layer; after magnetic connection, the flange plates are capable of being fixed by bolts, and a bottom end of the adjustable connecting rod is fixed on a top of the second connector.

In the preferred scheme of the photovoltaic assembly convenient for angle adjustment, the adjusting assembly includes:

a slide rail part fixed on the top of the adjusting base plate;

an adjusting part, where a bottom of the adjusting part is slidably connected with the slide rail part through a slider, and a bottom end face of the slider is provided with a groove, and gear teeth are arranged in the groove, a top of the adjusting part is provided with gear teeth;

two first auxiliary plates arranged on both sides of the bottom of the adjusting part, where a first rotating shaft is rotatably connected between the first auxiliary plates, and a first rotating gear is connected to the first rotating shaft, and the first rotating gear meshes with the gear teeth at the bottom of the adjusting part;

a driving motor arranged at one side of the two first auxiliary plates, where an output shaft of the driving motor is connected with the first rotating shaft;

two second auxiliary plates, where the two second auxiliary plates are oppositely arranged on both sides of the slide rail part and a second rotating shaft is rotatably connected between the two second auxiliary plates, two ends of the second rotating shaft penetrate through one of the auxiliary plates on a corresponding side, a middle of the second rotating shaft is connected with a second rotating gear, and the second rotating gear is meshed with the gear teeth on the top of the adjusting part;

a second U-shaped frame, where an opening of the second U-shaped frame faces the adjusting part, bottoms of two wall plates are respectively fixedly connected with a penetrating end of the second rotating shaft on a corresponding side, and a bottom of the photovoltaic panel fixing frame is fixed on a top of the second U-shaped frame;

an angle sensor arranged on the photovoltaic panel fixing frame and used for detecting angle information of the photovoltaic panel fixing frame;

a controller, where the controller is electrically connected with the driving motor and the angle sensor respectively and is capable of controlling action of the driving motor according to the angle information.

In the preferred scheme of the photovoltaic assembly convenient for angle adjustment, the photovoltaic panel fixing frame includes:

a fixed main plate, where the fixed main plate is fixed on the second U-shaped frame, and a plate surface of the fixed main plate is provided with an operation gap;

a threaded rod, where two ends of the threaded rod are provided with threads, and a middle of the threaded rod penetrates through and is rotatably connected with opposite side walls of the fixed main plate; a torsion block is fixed on a rod wall penetrating the operation gap on the threaded rod;

a smooth rod, where a middle of the smooth rod penetrates through the opposite side walls of the fixed main plate and is parallel to the threaded rod;

two clamping blocks, where the clamping blocks are respectively arranged at two ends of the threaded rod; each of the clamping blocks is provided with a threaded hole and a smooth hole of being matched and connected with the threaded rod and the smooth rod; the screw rod is twisted by the torsion block to drive two the clamping blocks to move and change a spacing between the clamping blocks.

Compared with the prior art, the disclosure has the advantages that the inclination angle of the photovoltaic panel can be detected in real time, and the angle of the photovoltaic panel can be adjusted according to environmental factors such as illumination, so as to adapt to the actual situation, ensure the smooth power generation and ensure the power generation;

the detachable connection can be realized through the photovoltaic mounting base, and the replacement and maintenance of the frame can be facilitated; and the installation and removal are relatively simple, and the existing buildings will not be damaged;

the photovoltaic mounting base can also be used to realize the fine adjustment of the position of the frame, which has stronger flexibility and wider installation adaptability in practical application;

it can also buffer the sudden impact force, protect the overall safety of the device and prolong the service life.

It is to be understood that both the foregoing general description and the following detailed description are exemplary and explanatory only and are not restrictive of the disclosure. Other features and aspects of the disclosure will become clearer from the following detailed description of exemplary embodiments with reference to the accompanying drawings.

BRIEF DESCRIPTION OF THE DRAWINGS

In order to explain the specific embodiment of the disclosure or the technical scheme in the prior art more clearly, the drawings needed in the description of the specific embodiment or the prior art will be briefly introduced below. Obviously, the drawings in the following description are some embodiments of the disclosure, and other drawings can be obtained according to these drawings without creative efforts for ordinary skilled in the field.

Figure 1:
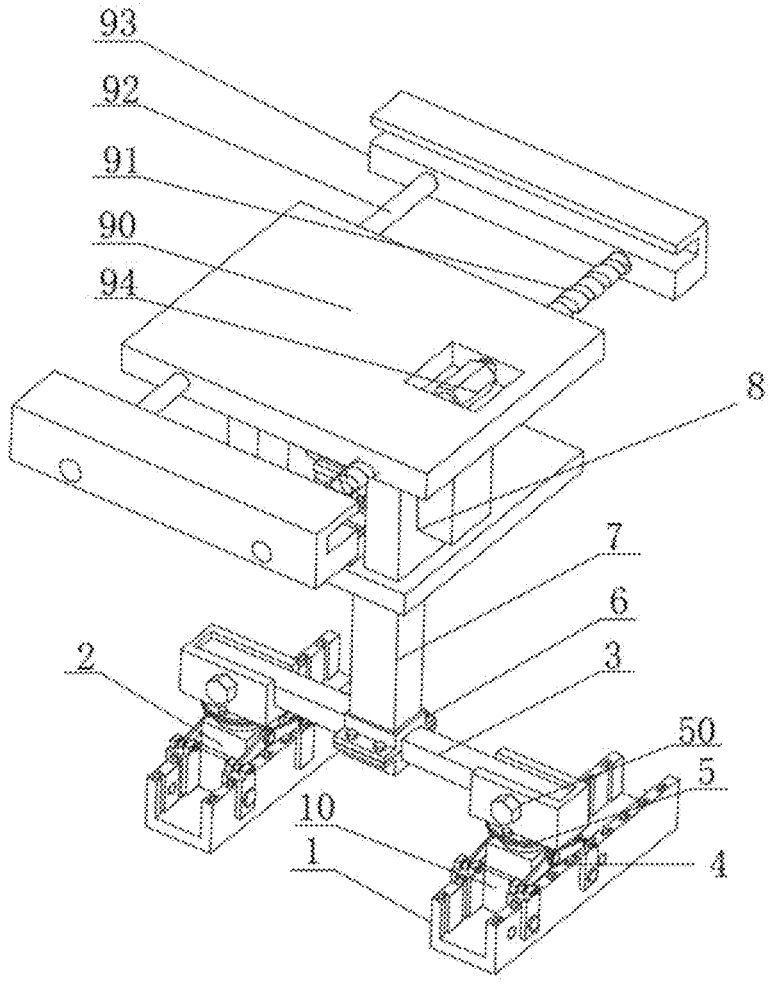
FIGS. 1-2 are schematic structural diagrams of a photovoltaic assembly convenient for angle adjustment from different perspectives in the embodiment of the disclosure.

LIST OF REFERENCE CHARACTERS 1 first slideway part; 10 first limiting part; 2 first connecting mechanism; 20 connecting base; 200 second sliding groove; 21 sliding frame; 210 extension rod; 211 extrusion plate; 212 buffer pad; 22 accommodating chamber; 23 rack part; 24 gear part; 25 spring coiling mechanism; 250 fixed inner cylinder; 251 fixed outer cylinder; 252 spring coiling part; 253 elastic pulling plate; 3 connecting beam; 4 second connecting mechanism; 40 rotating plate; 41 first U-shaped frame; 5 third connecting mechanism; 50 mounting seat; 6 frame connector; 7 adjustable connecting rod; 8 adjusting assembly; 80 slide rail part; 81 adjusting part; 82 driving motor; 83 second U-shaped frame; 84 first rotating gear; 85 second rotating gear; 9 photovoltaic panel fixing frame; 90 fixed main plate; 91 threaded rod; 92 smooth rod; 93 clamping block and 94 torsion block.

DETAILED DESCRIPTION OF THE EMBODIMENTS

In the following, the technical scheme of the disclosure will be described clearly and completely in combination with embodiments. Obviously, the described embodiments are a part of embodiments of the disclosure, but not all of embodiments. Based on the embodiments in the disclosure, all other embodiments obtained by ordinary skilled in the field without creative efforts belong to the scope of protection of the disclosure.

Figure 2:
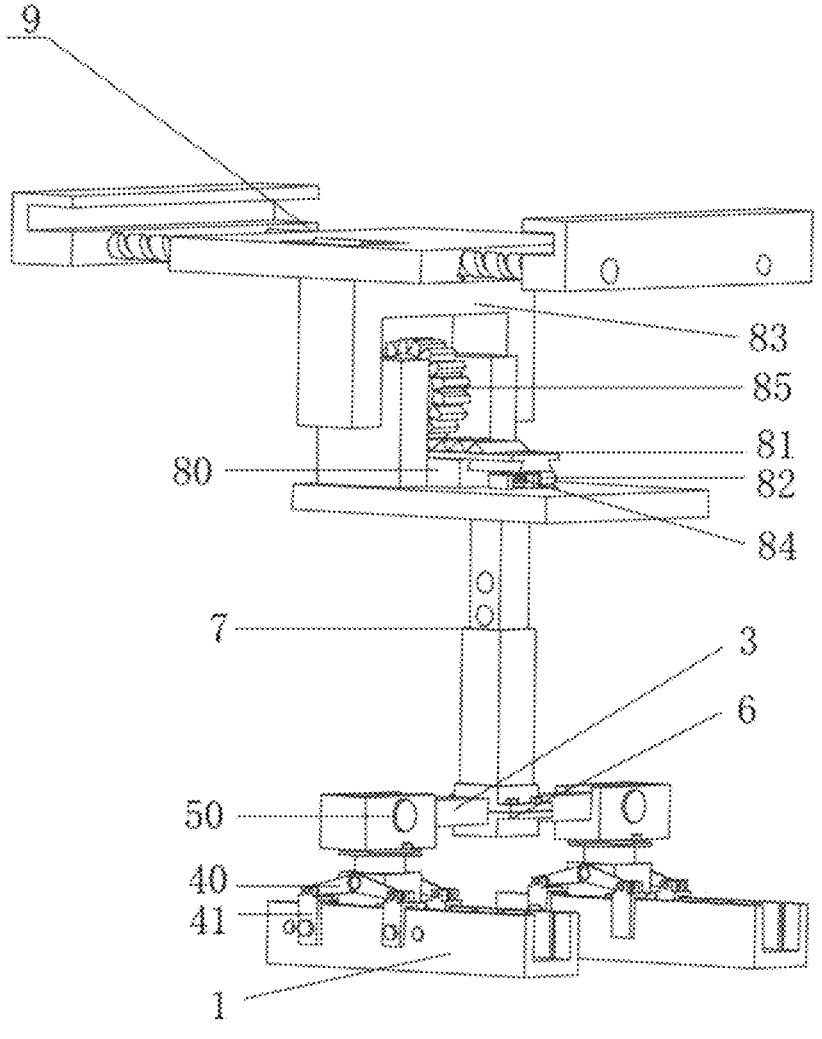
Figure 3:
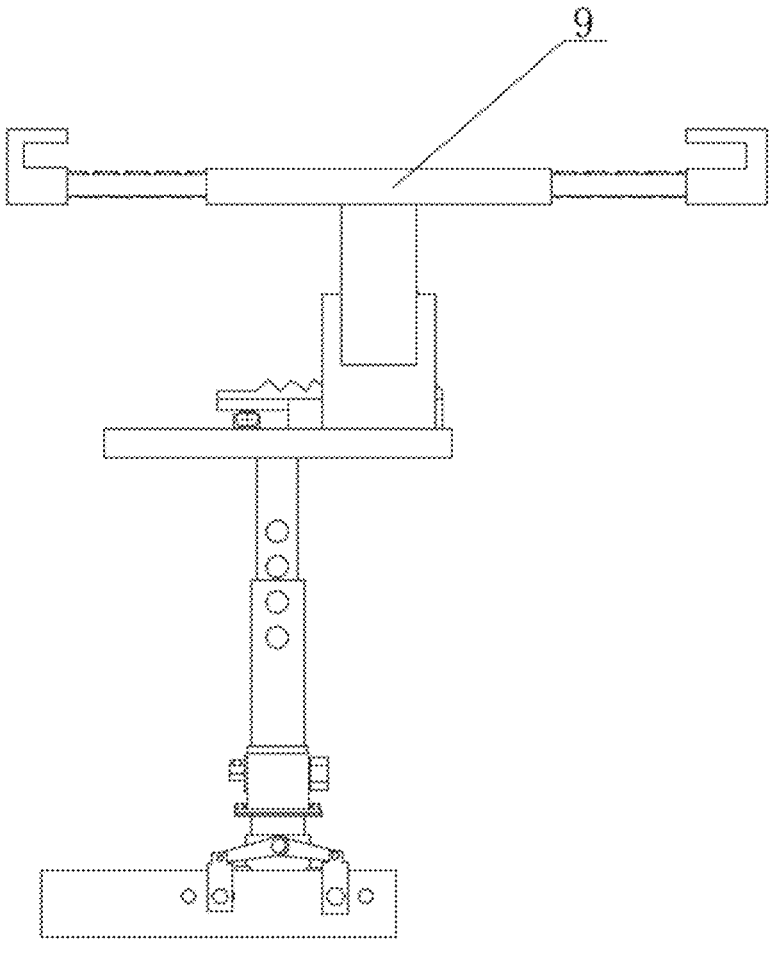
FIGS. 3-4 are schematic diagrams of a photovoltaic panel fixing frame at different angles in embodiments of the disclosure.
Figure 4:
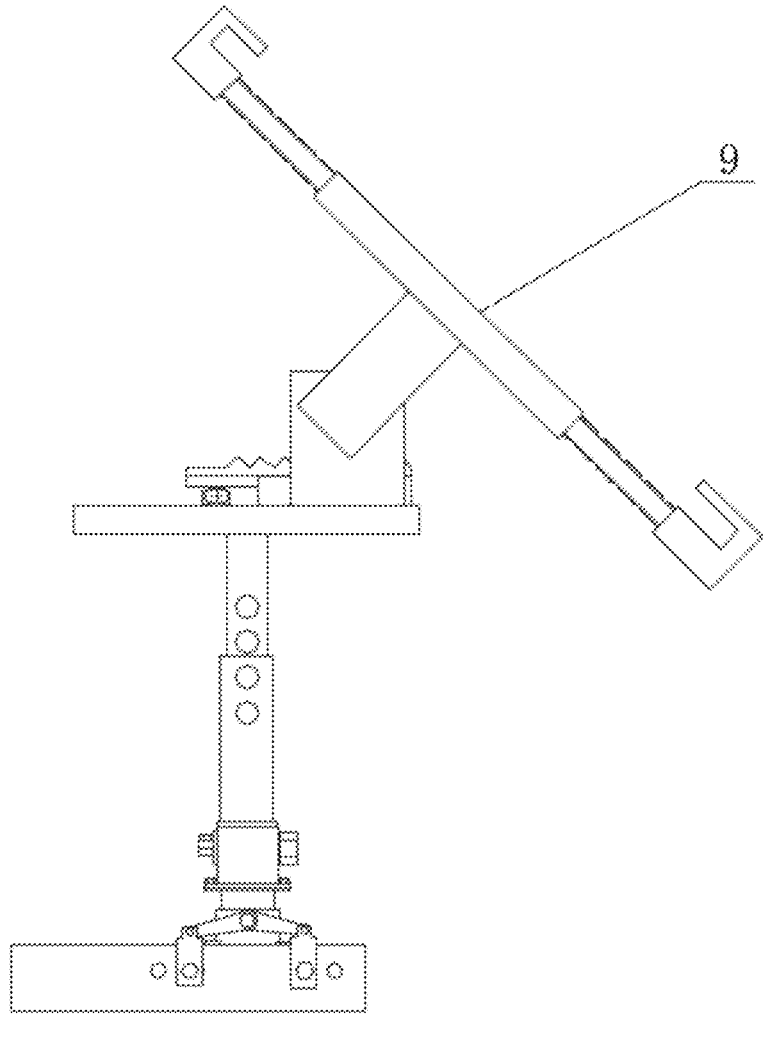
Figure 5:
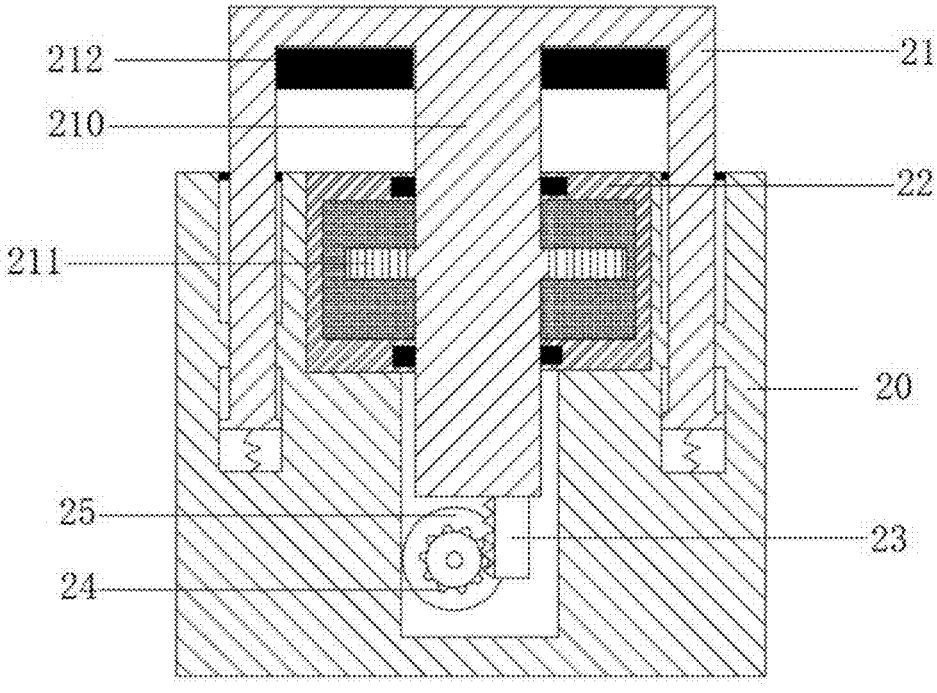
FIG. 5 is a principle schematic diagram of the first connecting mechanism in FIG. 1.
Figure 6:
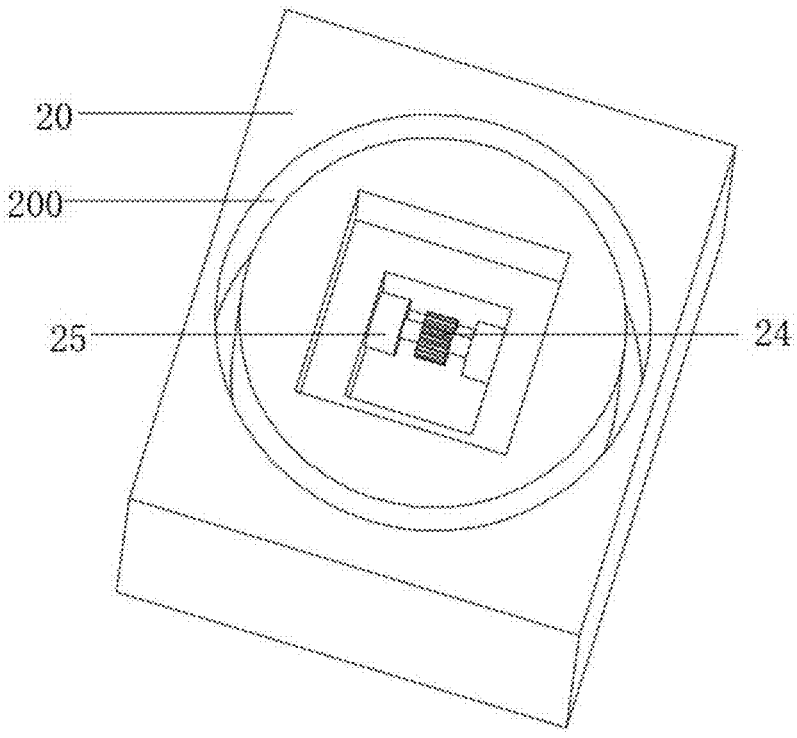
FIG. 6 is a schematic structural diagram of the connecting base in FIG. 5.
Figure 7:
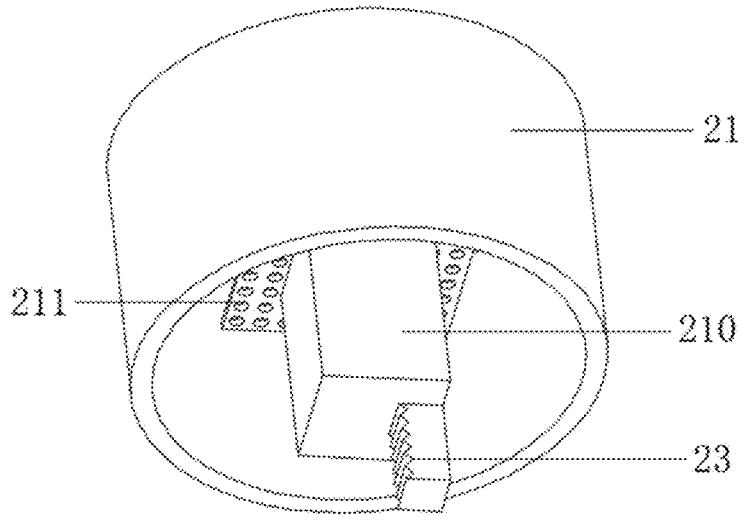
FIG. 7 is a schematic structural diagram of the sliding frame in FIG. 5.
Figure 8:
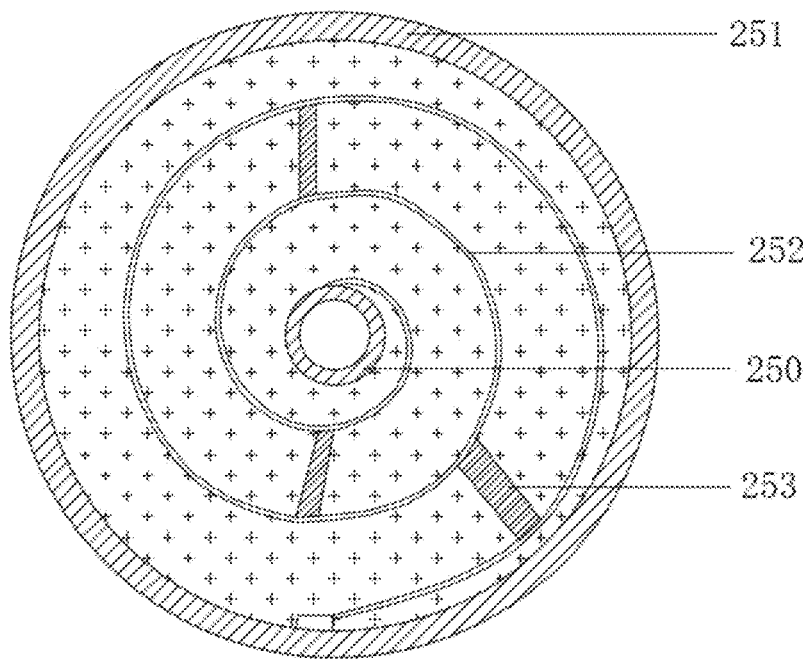
FIG. 8 is a principle schematic diagram of the spring coiling mechanism in FIG. 5.
Figure 9:
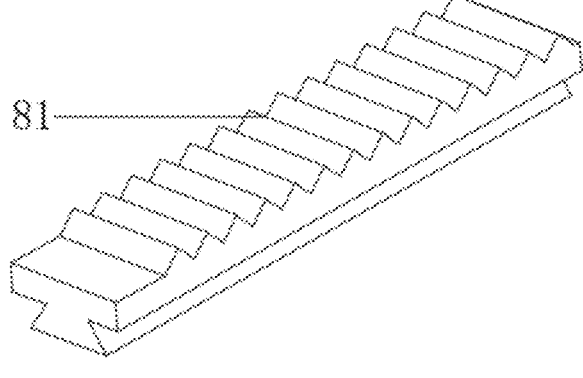
FIGS. 9-10 are schematic structural diagrams of the adjusting part from different perspectives in FIG. 1.
Figure 10:
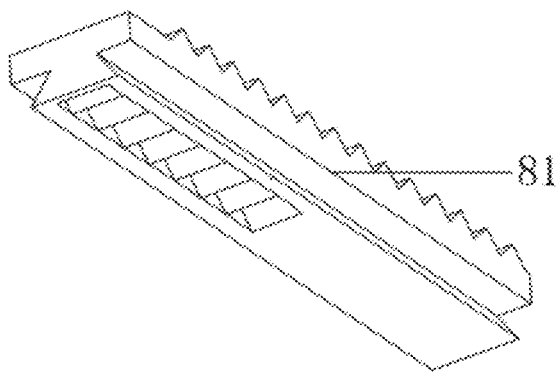

Referring to FIGS. 1-10, in order to improve the above problems, the disclosure provides a photovoltaic assembly convenient for angle adjustment, which includes a photovoltaic mounting base and a photovoltaic mounting frame; where, the photovoltaic mounting base is fixed on a fixture and is used for providing an installation station; the photovoltaic mounting frame is detachably mounted on the photovoltaic mounting base and is capable of adjusting angle, and a mounting end of the photovoltaic mounting frame is capable of adjusting mounting size and is used for mounting photovoltaic panels.

Specifically, the photovoltaic mounting base includes first slideway parts 1, first connecting mechanisms 2 and a connecting beam 3; where, two first slideway parts 1 are arranged in parallel; each of the first slideway parts 1 has a U-shaped structure, a top of each of the first slideway parts is open, and inner walls of opposite side walls of each of the first slideway parts are provided with a plurality of limiting grooves arranged in parallel, and the limiting grooves are matched with detachable first limiting parts 10; a plurality of limiting areas are formed by the first limiting parts 10; at least two first connecting mechanisms 2, where the first connecting mechanisms are arranged in corresponding limiting areas of the two first slideway parts 1; side walls of the first connecting mechanisms 2 are detachably connected with each of the first slideway parts 1 through second connecting mechanisms 4; a connecting beam 3, where two ends of the connecting beam 3 are respectively connected to a top of corresponding one of the first connecting mechanisms 2, the connecting beam is perpendicular to the first slideway parts 1; a photovoltaic mounting frame is installed on the connecting beam 3.

Specifically, the limiting groove is a groove structure with a T-shaped cross section, the first limiting part 10 is a plate structure, and both ends of the first limiting part 10 are T-shaped structures adapted to the limiting groove, which can penetrate along the top of the limiting groove. Every two first limiting parts 10 will separate a limiting area with the same size as the first connecting mechanism 2, and the first connecting mechanism 2 is embedded in the limiting area. Through this scheme, the installation position of the first connecting mechanism 2 on the first slideway part 1 can be changed, so as to be suitable for the situation that the position of the photovoltaic panel needs to be fine-tuned in the installation process, providing more position selectivity and stronger adaptability.

Specifically, the first connecting mechanism 2 includes a connecting base 20, a sliding frame 21, an accommodating chamber 22, a rack part 23, a connecting rotating shaft, a gear part 24 and spring coiling mechanisms 25; where, a top of the connecting base 20 is provided with a first sliding groove, an annular second sliding groove 200 is arranged outside the first sliding groove, and an inner wall of the second sliding groove 200 is provided with a limiting protrusion; the sliding frame 21 has a cylindrical structure and a middle of the sliding frame is provided with an extension rod 210; the extension rod 210 extends along the first sliding groove, a middle of an out wall of the extension rod 210 is connected with an extrusion plate 211, and the extrusion plate 211 is provided with a through hole; a top of the sliding frame 21 is detachably connected with the connecting beam 3, the outer wall of the sliding frame is slidably connected with the limiting protrusion, and a bottom of the outer wall of the sliding frame is provided with a limiting baffle, the limiting baffle is connected with a bottom of the second sliding groove 200 through a spring part; flexible buffer pads 212 are arranged between an inner wall of the sliding frame 21 and the extension rod 210; the buffer pads 212 may preferably be rubber pads; a top of the first sliding groove is provided with an expansion area, where an accommodating chamber 22 is embedded in the expansion area and sleeved outside the extension rod 210 to form a sliding sealing structure with the outer wall of the extension rod 210; the accommodating chamber 22 is filled with a buffer medium, and the extrusion plate 211 is located in the accommodating chamber 22, and the extrusion plate 211 is capable of reciprocating in the buffer medium; a rack part 23 vertically connected to a bottom of the extension rod 210; the connecting rotating shaft is rotatably connected to opposite side walls of the first sliding groove and is opposite to the rack part 23; the gear part 24 is fixed at a middle of the connecting rotating shaft and is is meshed with the rack part 23; the spring coiling mechanisms 25 are arranged two and are respectively sleeved at positions close to two ends of the connecting rotating shaft, and outer walls of the spring coiling mechanisms are fixed with an inner wall of the first sliding groove; when the gear part 24 and the rack part 23 are displaced relative to each other, the spring coiling mechanisms 25 are stressed and provide a reset reaction force.

Specifically, the buffer medium can preferably be a flexible mastic material, which can buffer through the through hole of the extrusion plate 211.

It should be understood that in the above scheme, when the photovoltaic mounting frame is subjected to external force, it will drive the connecting beam 3 to shake and press the sliding frame 21 to reciprocate. In the process of action, the downward movement of the sliding frame 21 can drive the rack part 23 to move downward, and then drive the gear part 24 to rotate, and finally the spring coiling part 252 in the spring coiling mechanism 25 will twist under the external force. The reaction force of the spring coiling part 252 can offset the external force and reduce the impact on the sliding frame 21. Moreover, during the downward movement, the extrusion plate 211 outside the extension rod 210 will press the buffer medium in the accommodating chamber 22, which also plays a role in buffering the impact force, improving the bearing strength against external force and ensuring the service life. When the external force disappears, the above parts are reversely reset under the reaction force of the spring coiling part 252 until they are restored to the original state. The outer wall of the sliding frame 21 and the second sliding groove 200 are in a sealed state, which can prevent impurities such as dust from entering the interior and polluting the outer wall of the extension rod 210, thus blocking the sliding, the use effect is improved and the maintenance frequency is reduced.

In the preferred embodiment of the photovoltaic assembly convenient for angle adjustment, the number of the second connecting mechanisms 4 is two, the second connecting mechanisms are respectively arranged on both sides of the first connecting mechanism 2. The second connecting mechanism 4 includes a fixed shaft and rotating plates 40.

The fixed shaft is vertically fixed on a side wall of the connecting base 20 of each of the first connecting mechanisms 2; the number of the rotating plates 40 is two, where and ends of the two rotating plates 40 are rotatably connected with the fixed shaft respectively; other ends of the two rotating plates 40 are hinged with a first U-shaped frame 41; the side walls of the first U-shaped frame 41 and the first slideway part 1 are both provided with suitable connecting holes; an open end of the first U-shaped frame 41 extends along the side wall of the first slideway part 1, and the first U-shaped frame 41 and the first slideway part 1 are detachably connected through bolts and the connecting holes.

In the above scheme, the freedom degree of the first connecting mechanism 2 in the vertical direction can be limited, and the first connecting mechanism 2 can be prevented from being separated from the first slideway part 1. When disassembly is required, only the bolts on the first U-shaped frame 41 need to be removed, so that the rotating plate 40 can be rotated, and the first U-shaped frame 41 can be separated from the first slideway part 1. At this time, it can be taken out only by pulling up the first connecting mechanism 2, which is very convenient and has low realization difficulty.

Specifically, the spring coiling mechanism 25 includes a fixed inner cylinder 250, a fixed outer cylinder 251, a spring coiling part 252, elastic pulling plates 253 and an elastic filler; where, the fixed inner cylinder 250 is sleeved and fixed on an outer wall of the connecting rotating shaft, the fixed outer cylinder 251 is sleeved outside the fixed inner cylinder 250 to form an inner cavity inside, and an outer wall of the fixed outer cylinder 251 is fixed with the inner wall of the first sliding groove, the fixed inner cylinder 250 is capable of rotating relatively with the fixed outer cylinder 251, an inner end of the spring coiling part 252 is connected with the fixed outer cylinder 250, and an outer end is connected with the fixed outer cylinder 251, and a plurality of the elastic pulling plates 253 are arranged inside the spring coiling part 252 and are connected with a corresponding inner wall of the spring coiling part 252; the elastic filler is filled in the inner cavity.

Specifically, the elastic pulling plate 253 may be an elastic rubber plate, and the elastic filler may be a round ball made of rubber material.

It should be noted that when the gear part 24 rotates, it can drive the connecting rotating shaft and the fixed inner cylinder 250 to rotate synchronously, so that the spring coiling part 252 is curled and deformed, and the curled and deformed spring coiling part 252 will squeeze the elastic filler. The elastic filler is deformed by external force, and the deformation of the spring coiling part 252 will pull elastic pulling plate 253 to deform. The forces generated by the deformation of the elastic pulling plate 253, the elastic filler and the spring coiling part 252 will force the spring coiling part 252 to return to its original state, so that the rotating force in the opposite direction is applied to the connecting rotating shaft and the fixed inner cylinder 250 to counteract the external force and offset the external force, thereby realizing the buffering of the impact force and being beneficial to the long-term use of the whole device.

In the above-mentioned embodiment of the photovoltaic assembly convenient for angle adjustment, the top of the sliding frame 21 is connected with the connecting beam 3 through the third connecting mechanism 5, the third connecting mechanism 5 includes flange parts and a mounting seat 50, where, the flange parts are arranged two, where butting ends of the flange parts are connected by bolts; a connecting end of one of the flange parts is fixed at the top of the sliding frame 21; the mounting seat 50 has a U-shaped structure and one side is sealed; a side wall of the mounting seat 50 and ends of the connecting beam 3 are both provided with connecting through holes, the connecting through holes are capable of being connected by bolts after being embedded; the mounting seat 50 is fixed at a top connecting end of another one of the flange parts.

Through the above scheme, the independent disassembly of the first connecting mechanism 2 can be realized, and then the independent maintenance and maintenance of each mechanism can be realized, and the maintenance cost is lower.

In the specific scheme of the photovoltaic assembly convenient for angle adjustment, the photovoltaic mounting frame includes a frame connector 6, an adjustable connecting rod 7, an adjusting base plate, an adjusting assembly 8 and a photovoltaic panel fixing frame 9;

a frame connector 6 is detachably connected to the connecting beam 3; an adjustable connecting rod 7 has a sleeve structure and is limited and connected by bolts, and is vertically connected to a top of the frame connector 6; an adjusting base plate is connected with a top of a telescopic rod of the adjustable connecting rod 7; an adjusting assembly 8 is connected to a top of the adjusting base plate; a photovoltaic panel fixing frame 9 is fixed at an action end of the adjusting assembly 8.

Specifically, the frame connector 6 includes a first connector and a second connector; the opposite ends of the first connector and the second connector are both provided with clamping grooves adapted to the connecting beam 3, and the edges of the clamping grooves extend outwards to form flange plates, and the butting surfaces of the first connector and the second connector are provided with a magnet layer. After magnetic connection, the flange plates can be fixed by bolts, and the bottom end of the adjustable connecting rod 7 is fixed on the top of the second connector. The magnet layer can prevent the connector from falling during the assembly process, avoid losing parts or hurting the assembler, and free hands at the same time, which is more convenient for assembly, conducive to improving the assembly efficiency and shortening the construction period.

In the specific embodiment of the photovoltaic assembly convenient for angle adjustment, the adjusting assembly 8 includes a slide rail part 80, an adjusting part 81, first auxiliary plates, a driving motor 82, second auxiliary plates, a second U-shaped frame 83, an angle sensor and a controller; where, the slide rail part 80 is fixed on the top of the adjusting base plate, and the groove in the middle of the slide rail member is dovetail-shaped; a bottom of the adjusting part 81 is slidably connected with the slide rail part 80 through a slider, and a bottom end face of the slider is provided with a groove, and gear teeth are arranged in the groove, a top of the adjusting part 81 is provided with gear teeth; two first auxiliary plates arranged on both sides of the bottom of the adjusting part 81, where a first rotating shaft is rotatably connected between the first auxiliary plates, and a first rotating gear 84 is connected to the first rotating shaft, and the first rotating gear 84 meshes with the gear teeth at the bottom of the adjusting part 81; a driving motor 82 is arranged at one side of the two first auxiliary plates, where an output shaft of the driving motor is connected with the first rotating shaft; the two second auxiliary plates are oppositely arranged on both sides of the slide rail part 80 and a second rotating shaft is rotatably connected between the two second auxiliary plates, two ends of the second rotating shaft penetrate through one of the auxiliary plates on a corresponding side, a middle of the second rotating shaft is connected with a second rotating gear 85, and the second rotating gear 85 is meshed with the gear teeth on the top of the adjusting part 81; an opening of the second U-shaped frame 83 faces the adjusting part 81, bottoms of two wall plates are respectively fixedly connected with a penetrating end of the second rotating shaft on a corresponding side, and a bottom of the photovoltaic panel fixing frame 9 is fixed on a top of the second U-shaped frame 83; an angle sensor is arranged on the photovoltaic panel fixing frame 9 and is used for detecting angle information of the photovoltaic panel fixing frame 9; the controller is electrically connected with the driving motor 82 and the angle sensor respectively and is capable of controlling action of the driving motor 82 according to the angle information.

In the above scheme, when it is necessary to adjust the angle, the controller controls the driving motor 82 to rotate, and then drives the first rotating gear 84 to rotate, so that the adjusting part 81 slides on the slide rail part 80, and then drives the second rotating gear 85 and the second rotating shaft to rotate, and finally drives the second U-shaped frame 83 and the photovoltaic panel fixing frame 9 installed on the second U-shaped frame 83 to rotate. When the angle sensor detects that the photovoltaic panel fixing frame 9 is adjusted to a preset angle, the controller controls the driving motor 82 to stop, and the angle adjustment is completed, so that the angle of the photovoltaic panel can be accurately adjusted to adapt to the actual situation, ensure the smooth power generation and ensure the power generation. And it is more convenient, faster and more controllable.

In the specific embodiment of the photovoltaic assembly convenient for angle adjustment, the photovoltaic panel fixing frame 9 includes a fixing main plate 90, a threaded rod 91, a smooth rod 92 and clamping blocks 93; where, the fixed main plate 90 is fixed on the second U-shaped frame 83, and a plate surface of the fixed main plate is provided with an operation gap; two ends of the threaded rod 91 are provided with threads, and a middle of the threaded rod penetrates through and is rotatably connected with opposite side walls of the fixed main plate 90; a torsion block 94 is fixed on a rod wall penetrating the operation gap on the threaded rod 91; a middle of the smooth rod 92 penetrates through the opposite side walls of the fixed main plate 90 and is parallel to the threaded rod 91; the clamping blocks is provided with two, where the clamping blocks are respectively arranged at two ends of the threaded rod 91; each of the clamping blocks 93 is provided with a threaded hole and a smooth hole of being matched and connected with the threaded rod 91 and the smooth rod 92; the screw rod 91 is twisted by the torsion block 94 to drive two the clamping blocks 93 to move and change a spacing between the clamping blocks 93.

In the above scheme, when the torsion block is rotated, the threaded rod 91 rotates, which can drive the two opposite clamping blocks 93 to be close or far away, so as to realize the spacing adjustment, realize the size adjustment according to photovoltaic panels with different sizes, and further enhance the installation adaptability.

In the description of the disclosure, it should be understood that the azimuth or positional relationship indicated by the terms "center", "longitudinal direction", "transverse direction", "length", "width", "thickness", "up", "down", "front", "back", "left", "right", "vertical", "horizontal", "top", "bottom", "inner", "outer", "clockwise", "counterclockwise", "axial", "radial", "circumferential" is based on the azimuth or positional relationship shown in the attached drawings, only for the convenience of describing the disclosure and simplifying the description, and does not indicate or imply that the device or element referred to must have a specific orientation, be constructed and operated in a specific orientation, so it cannot be understood as a limitation of the disclosure.

In addition, the terms "first" and "second" are only used for descriptive purposes, and cannot be understood as indicating or implying relative importance or implicitly indicating the number of indicated technical features. Therefore, the features defined as "first" and "second" can explicitly or implicitly include at least one of these features. In the description of the disclosure, "a plurality of" means at least two, such as two, three, etc., unless otherwise specifically defined.

In the disclosure, unless otherwise specified and limited, the terms "installation", "connecting", "connection" and "fixed" should be broadly understood, for example, they can be fixed connection, detachable connection or integrated. It can be mechanically connected, electrically connected or communicated with each other. It can be directly connected or indirectly connected through an intermediary, and it can be the internal connection of two elements or the interaction between two elements, unless otherwise specified. For those skilled in the art, the specific meanings of the above terms in the disclosure can be understood according to specific situations.

In the disclosure, unless otherwise specified and limited, the first feature "above" or "below" the second feature may be the direct contact between the first and second features, or the indirect contact between the first and second features through an intermediary. Moreover, the first feature is "above", "on" and "upper" the second feature, which can mean that the first feature is directly above or obliquely above the second feature, or just means that the horizontal height of the first feature is higher than the second feature. The first feature is "below", "under" and "underneath" the second feature can mean that the first feature is directly or obliquely below the second feature, or just means that the horizontal height of the first feature is smaller than the second feature.

In the disclosure, the terms "one embodiment", "some embodiments", "examples", "specific examples" or "some examples" etc. mean that the specific features, structures, materials or characteristics described in connection with this embodiment or example are included in at least one embodiment or example of the disclosure. In this description, the schematic expressions of the above terms are not necessarily aimed at the same embodiment or example. Moreover, the specific features, structures, materials or characteristics described may be combined in any one or more embodiments or examples in a suitable manner. In addition, those skilled in the art can combine and assembly different embodiments or examples and features of different embodiments or examples described in this description without contradicting each other.

Although the embodiments of the disclosure have been shown and described above, it can be understood that the above embodiments are exemplary and cannot be understood as limitations of the disclosure, and those skilled in the art can make changes, modifications, substitutions and variations to the above embodiments within the scope of the disclosure.

The invention claimed is:

1. A photovoltaic assembly for angle adjustment, comprising:

a photovoltaic mounting base, wherein the photovoltaic mounting base is fixed on a fixture and is used for providing an installation station; the photovoltaic mounting base comprises two first slideway parts, the two first slideway parts are arranged in parallel; each of the two first slideway parts has a U-shaped structure, a top of each of the two first slideway parts is open, and inner walls of opposite side walls of each of the two first slideway parts are provided with a plurality of limiting grooves arranged in parallel, and the limiting grooves are matched with detachable first limiting parts; a plurality of limiting areas are formed by the first limiting parts; at least two first connecting mechanisms, wherein the first connecting mechanisms are arranged in corresponding limiting areas of the two first slideway parts; side walls of the first connecting mechanisms are detachably connected with each of the two first slideway parts through second connecting mechanisms; a connecting beam, wherein two ends of the connecting beam are connected to a top of one of the first connecting mechanisms, the connecting beam is perpendicular to the two first slideway parts; a photovoltaic mounting frame is installed on the connecting beam;

the photovoltaic mounting frame, wherein the photovoltaic mounting frame is detachably mounted on the connecting beam and is capable of adjusting angle, and a mounting end of the photovoltaic mounting frame is capable of adjusting mounting size and is used for mounting photovoltaic panels;

wherein the photovoltaic mounting frame comprises: a frame connector detachably connected to the connecting beam; an adjustable connecting rod vertically connected to a top of the frame connector; an adjusting base plate connected with a top of a telescopic rod of the adjustable connecting rod; an adjusting assembly connected to a top of the adjusting base plate; a photovoltaic panel fixing frame fixed on a second U-shaped frame of the adjusting assembly;

the frame connector comprises a first connector and a second connector; opposite ends of the first connector and the second connector are both provided with clamping grooves that are fitted with the connecting beam, and edges of the clamping grooves extend outwards to form flange plates, and butting surfaces of the first connector and butting surface of the second connector are provided with a magnet layer; in response to determining that the first connector and the second connector are magnetically connected, the flange plates are capable of being fixed by bolts, and a bottom end of the adjustable connecting rod is fixed on a top of the second connector;

wherein the adjusting assembly comprises: a slide rail part fixed on the top of the adjusting base plate; an adjusting part, wherein a bottom of the adjusting part is slidably connected with the slide rail part through a slider, and a bottom end face of the slider is provided with a groove, and inner gear teeth are arranged in the groove, a top of the adjusting part is provided with top gear teeth; two first auxiliary plates arranged on both sides of the bottom of the adjusting part, wherein a first rotating shaft is rotatably connected between the first auxiliary plates, and a first rotating gear is connected to the first rotating shaft, and the first rotating gear meshes with bottom gear teeth at the bottom of the adjusting part; a driving motor arranged at one side of the two first auxiliary plates, wherein an output shaft of the driving motor is connected with the first rotating shaft; two second auxiliary plates, wherein the two second auxiliary plates are oppositely arranged on both sides of the slide rail part and a second rotating shaft is rotatably connected between the two second auxiliary plates, two ends of the second rotating shaft penetrate through one of the auxiliary plates on a corresponding side, a middle of the second rotating shaft is connected with a second rotating gear, and the second rotating gear is meshed with the top gear teeth on the top of the adjusting part; a second U-shaped frame, wherein an opening of the second U-shaped frame faces the adjusting part, bottoms of two wall plates are respectively fixedly connected with a penetrating end of the second rotating shaft that is opposite to the two wall plates, and a bottom of the photovoltaic panel fixing frame is fixed on a top of the second U-shaped frame; an angle sensor arranged on the photovoltaic panel fixing frame and used for detecting angle information of the photovoltaic panel fixing frame; a controller, wherein the controller is electrically connected with the driving motor and the angle sensor respectively and is capable of controlling action of the driving motor according to the angle information;

wherein each of the first connecting mechanisms comprises:

a connecting base, wherein a top of the connecting base is provided with a first sliding groove, an annular second sliding groove is arranged outside the first sliding groove, and an inner wall of the second sliding groove is provided with a limiting protrusion;

a sliding frame, wherein the sliding frame has a cylindrical structure and a middle of the sliding frame is provided with an extension rod; the extension rod extends along the first sliding groove, a middle of an out wall of the extension rod is connected with an extrusion plate, and the extrusion plate is provided with a through hole; a top of the sliding frame is detachably connected with the connecting beam, the outer wall is slidably connected with the limiting protrusion, and a bottom of the outer wall is provided with a limiting baffle, the limiting baffle is connected with a bottom of the second sliding groove through a spring part; flexible buffer pads are arranged between an inner wall of the sliding frame and the extension rod;

a top of the first sliding groove is provided with an expansion area, wherein an accommodating chamber is embedded in the expansion area and sleeved outside the extension rod to form a sliding sealing structure with the outer wall of the extension rod; the accommodating chamber is filled with a buffer medium, and the extrusion plate is located in the accommodating chamber, and the extrusion plate is capable of reciprocating in the buffer medium;

a rack part vertically connected to a bottom of the extension rod;

a connecting rotating shaft, wherein the connecting rotating shaft is rotatably connected to opposite side walls of the first sliding groove and is opposite to the rack part;

a gear part, wherein the gear part is fixed at a middle of the connecting rotating shaft and is is meshed with the rack part;

two spring coiling mechanisms, wherein the two spring coiling mechanisms are respectively sleeved at positions close to two ends of the connecting rotating shaft, and outer walls are fixed with an inner wall of the first sliding groove; when the gear part and the rack part are displaced relative to each other, the spring coiling mechanisms are stressed and provide a reset reaction force;

a plurality of two second connecting mechanism are provided and are respectively arranged on both sides of each of the first connecting mechanisms; each of the second connecting mechanisms comprises:

a fixed shaft vertically fixed on a side wall of the connecting base of each of the first connecting mechanisms;

two rotating plates, wherein and ends of the two rotating plates are rotatably connected with the fixed shaft respectively; other ends of the two rotating plates are hinged with a first U-shaped frame; the side walls of the first U-shaped frame and the two first slideway parts are both provided with connecting holes; an open end of the first U-shaped frame extends along the side wall of each of the two first slideway parts, and the first U-shaped frame and each of the two first slideway parts are detachably connected through bolts and the connecting holes.

2. The photovoltaic assembly for angle adjustment according to claim 1, wherein each of the spring coiling mechanisms comprises a fixed inner cylinder, a fixed outer cylinder, a spring coiling part, elastic pulling plates and an elastic filler; wherein, the fixed inner cylinder is sleeved and fixed on an outer wall of the connecting rotating shaft, the fixed outer cylinder is sleeved outside the fixed inner cylinder to form an inner cavity between the fixed inner cylinder and the fixed outer cylinder, and an outer wall of the fixed outer cylinder is fixed with the inner wall of the first sliding groove, the fixed inner cylinder is capable of rotating relatively with the fixed outer cylinder, an inner end of the spring coiling part is connected with the fixed outer cylinder, and an outer end is connected with the fixed outer cylinder, and a plurality of the elastic pulling plates are arranged inside the spring coiling part and are connected with a corresponding inner wall of the spring coiling part; the elastic filler is filled in the inner cavity.

3. The photovoltaic assembly for angle adjustment according to claim 2, wherein the top of the sliding frame is connected with the connecting beam through a third connecting mechanism, and the third connecting mechanism comprises:

two flange parts, wherein butting ends of the flange parts are connected by bolts; a connecting end of one of the flange parts is fixed at the top of the sliding frame;

a mounting seat, wherein the mounting seat has a U-shaped structure and one side is sealed; the mounting seat is fixed at a top connecting end of another one of the flange parts, and a side wall of the mounting seat and ends of the connecting beam are both provided with connecting through holes, the connecting through holes are capable of being connected by bolts after being embedded.

4. The photovoltaic assembly for angle adjustment according to claim 3, wherein the photovoltaic panel fixing frame comprises:

a fixed main plate, wherein the fixed main plate is fixed on the second U-shaped frame, and a plate surface of the fixed main plate is provided with gap;

a threaded rod, wherein two ends of the threaded rod are provided with threads, and a middle of the threaded rod penetrates through and is rotatably connected with opposite side walls of the fixed main plate; a torsion block is fixed on a rod wall penetrating the gap on the threaded rod;

a smooth rod, wherein a middle of the smooth rod penetrates through the opposite side walls of the fixed main plate and is parallel to the threaded rod;

two clamping blocks, wherein the clamping blocks are respectively arranged at two ends of the threaded rod; each of the clamping blocks is provided with a threaded hole and a smooth hole of being matched and connected with the threaded rod and the smooth rod; the screw rod is twisted by the torsion block to drive two the clamping blocks to move and change a spacing between the clamping blocks.

* * * * *